(12) United States Patent
Evangelista et al.

(10) Patent No.: US 12,321,509 B2
(45) Date of Patent: Jun. 3, 2025

(54) LAYOUT OF XR CONTENT IN XR SPACE

(71) Applicant: Samsung Electronics Co., Ltd., Suwon-si (KR)

(72) Inventors: Edgar Evangelista, San Jose, CA (US); Jaehyun Kim, San Francisco, CA (US); Hiroshi Horii, Pleasanton, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 49 days.

(21) Appl. No.: 18/213,546

(22) Filed: Jun. 23, 2023

(65) Prior Publication Data

US 2024/0019925 A1 Jan. 18, 2024

Related U.S. Application Data

(60) Provisional application No. 63/389,124, filed on Jul. 14, 2022.

(51) Int. Cl.
*G06F 3/01* (2006.01)
*G06F 3/04815* (2022.01)
*G06F 3/04845* (2022.01)
*H04W 4/029* (2018.01)

(52) U.S. Cl.
CPC .......... *G06F 3/011* (2013.01); *G06F 3/04815* (2013.01); *G06F 3/04845* (2013.01); *H04W 4/029* (2018.02)

(58) Field of Classification Search
None
See application file for complete search history.

(56) References Cited

U.S. PATENT DOCUMENTS

| | | |
|---|---|---|
| 10,156,908 B2 | 12/2018 | Stafford |
| 10,466,794 B2 | 11/2019 | Maeda |
| 10,754,417 B2 | 8/2020 | Harvey |
| 11,204,678 B1 | 12/2021 | Baker |
| 11,287,659 B2 | 3/2022 | Hoover |
| 11,301,031 B2 | 4/2022 | Yokoyama |
| 11,327,630 B1 | 5/2022 | Khan |
| 11,334,212 B2 | 5/2022 | Ravasz |
| 11,410,403 B1 | 8/2022 | Bhushan |
| 11,430,196 B2 | 8/2022 | Bhushan |
| 11,514,656 B2 | 11/2022 | Berliner |
| 2018/0088323 A1 | 3/2018 | Bao |
| 2019/0313059 A1 | 10/2019 | Agarawala |
| 2022/0075517 A1 | 3/2022 | Bailey |
| 2022/0083197 A1 | 3/2022 | Rockel |
| 2022/0101612 A1 | 3/2022 | Palangie |
| 2022/0148274 A1 | 5/2022 | Brown, Iv |
| 2023/0237192 A1* | 7/2023 | Kahan ................. G06V 10/60 726/1 |

OTHER PUBLICATIONS

"Hand Gesture Recognition for Augmented Reality Interaction on Android", TU Berlin—Industrielle Automatisierungstechnik (https://www.youtube.com/watch?v=HdMo60F_MTI).

* cited by examiner

*Primary Examiner* — Christopher J Kohlman

(57) ABSTRACT

In one embodiment, a method includes determining a location of a user of an extended reality (XR) system. The method further includes determining, based on the determined location, a location-specific layout for one or more XR objects in an XR environment for display to the user and displaying, by a display of the XR system, the location-specific layout in the XR environment.

20 Claims, 13 Drawing Sheets

LAYOUT OF XR CONTENT IN XR SPACE

PRIORITY CLAIM

This application claims the benefit under 35 U.S.C. § 119 of U.S. Provisional Patent Application 63/389,124 filed Jul. 14, 2022, which is incorporated by reference herein.

TECHNICAL FIELD

This application generally relates to a layout of XR content in XR space.

BACKGROUND

An extended reality (XR) system can include displaying computer-generated content combined with a real-world scene, for example as in augmented reality, or can include displaying only computer-generated content, such as in virtual reality. XR content is typically displayed as three-dimensional content. An XR system can include, for example, a head-mounted display (HMD), such as a headset, a pair of glasses, etc., that includes one or more displays for displaying XR content. XR content can include virtual objects or content from one or more applications, such as a web browser, a productivity application, a gaming application, etc., and this content can be displayed along with portions of a user's physical environment, i.e., portions of the real-world environment in the vicinity of the user.

DESCRIPTION OF EXAMPLE EMBODIMENTS

XR environments can be much more dynamic than traditional computing environments, for example because users are not limited to physical displays for viewing content and instead can place XR objects, such as applications, anywhere in the XR space, including in three dimensions. However, selecting, placing, and arranging XR content each time a user begins an XR experience is a burdensome task. In addition, because an XR system can move with a user as the use changes location, opening the most recently used XR content from the user's last session may not be relevant to the user's current session at a new location.

Figure 1:
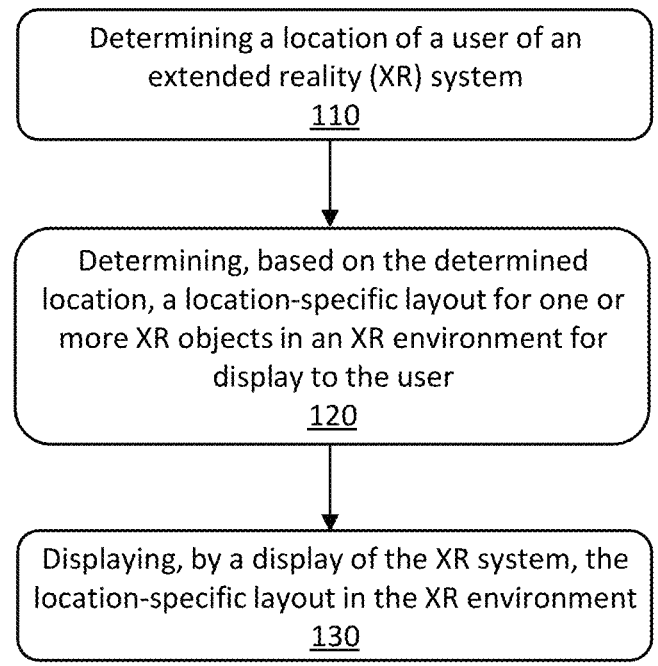
FIG. 1 an example method for generating a location-specific layout of XR objects.
Figure 2:
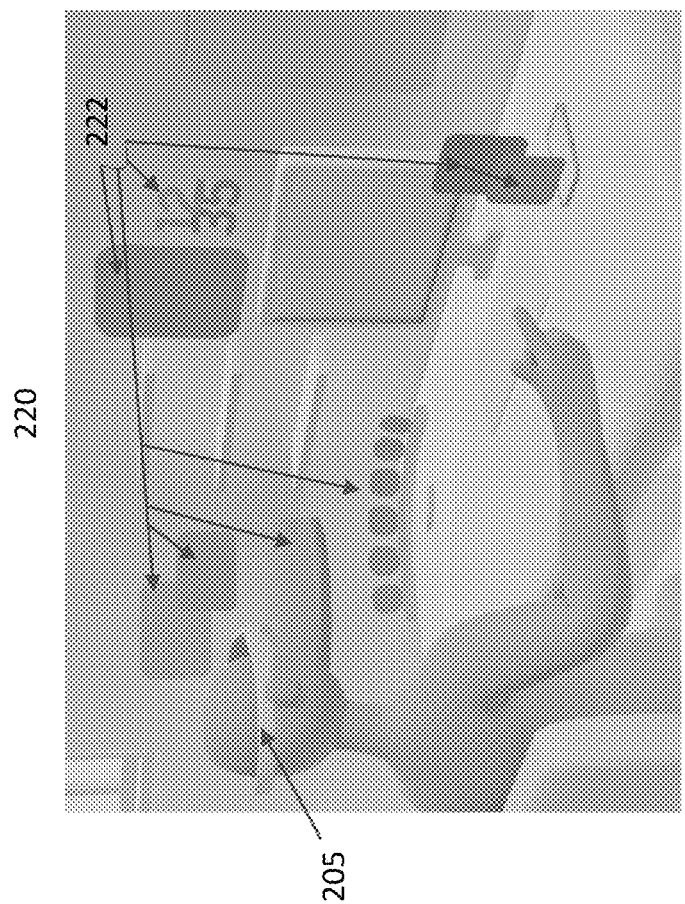
FIG. 2 illustrates example layouts of XR objects.
Figure 2:
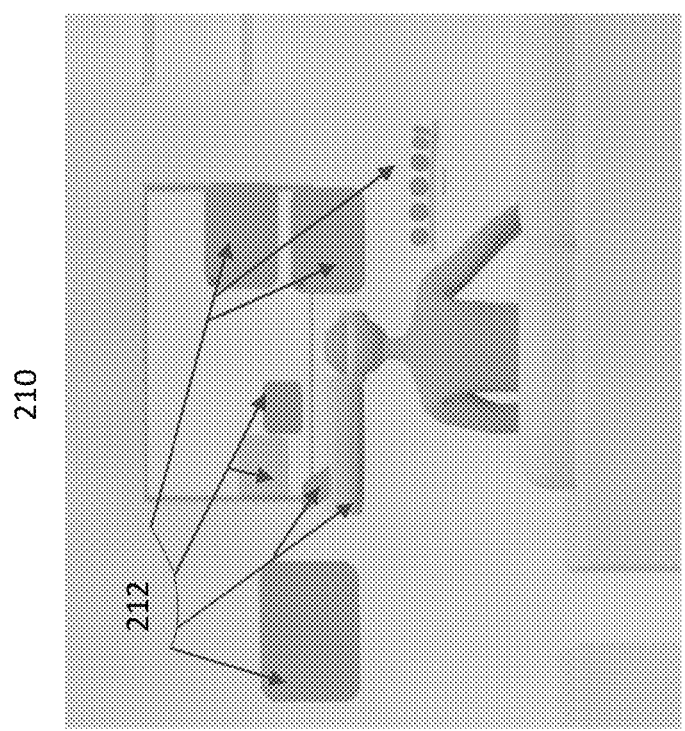

FIG. 1 illustrates an example method for generating a location-specific layout of XR objects for a user of an XR system. XR objects can include any suitable XR content, such as applications, virtual objects, text, etc. The location-specific layout specifies the XR objects to be presented along with the position, size, and orientation of each object within the XR environment. For instance, FIG. 2 illustrates example layouts in different locations. In the example of FIG. 2, layout 210 is provided when the user is in their living room, and layout 210 includes the specific XR objects 212 in their respective locations within the user's living-room environment. Layout 220 is provided when the user is in their office at work, and layout 220 includes the specific XR objects 222 in their respective locations within the user's work-office environment. In the example of FIG. 2, the XR system is a headset 205. The XR system may be a single unit, such as a headset, or may include distributed components, such as a desktop computer that performs some XR processing and a headset that displays XR content to the user.

Step 110 of the example method of FIG. 1 includes determining a location of a user of an extended reality (XR) system. In particular embodiments, the location of the user may be based on location coordinates of a device associated with the user, such as GPS coordinates of a smartphone, smartwatch, XR system, etc. associated with the user. In particular embodiments, the location of the user may be based on a connection between devices. For example, a user's device, such as a smartphone, may be connected to a particular Wi-Fi network, and that Wi-Fi network may be associated with a known location. As another example, a device such as an XR system may be connected to another device via Bluetooth, and that other device may be associated with a known location (e.g., by being in a fixed location, as for a TV, or by being recently located).

In particular embodiments, determining a location of a user may include identifying a physical environment of the user. For example, one or more cameras, including RGB cameras, depth camera, etc. may take one or more images of the environment of the user. In particular embodiments, the XR system, such as a headset, may include one or more cameras for taking the images of the user's physical environment. In particular embodiments, object recognition may be used to identify objects in the user's environment. For example, if any of an oven, fridge, microwave, etc. are identified in the user's environment then the user may be determined to be in a kitchen, and if the user's GPS coordinates indicate that the user is at home, then the user may be determined to be in their home kitchen. As another example, if a desk, monitor, etc. are identified in the user's environment, then the user may be located in an office. If the user's phone is connected to a WiFi network associated with their work, then the user may be determined to be located at their work office, e.g., as opposed to their home office.

In addition or the alternative, in particular embodiments determining a user's location may include determining a spatial relationship between two or more objects in the user's environment. For example, a user's kitchen may include a particular spatial relationship between their oven, fridge, and a utensil holder, and the presence of not only these objects but also of the particular spatial relationship between them may indicate that the user is in their home kitchen, as opposed to a different kitchen.

Step 120 of the example method of FIG. 1 includes determining, based on the determined location, a location-specific layout for one or more XR objects in an XR environment for display to the user. FIGS. 3A-3D illustrate an example procedure for performing the example method of FIG. 1. For instance, with reference to FIG. 3A, location data may be determined or otherwise accessed, and this location data may be used to lookup information in a location database that stores location data with specific location data keys, i.e., location identifiers. For example, a collection of location data may be the user's GPS signal and specific objects identified in the user's environment, and the location data key corresponding to that particular set of location data may be a specific room, e.g., the living room, in the user's home.

In particular embodiments, a location-specific layout may be determined with reference to a location-specific anchor, i.e., a reference anchor that corresponds to the particular location that the user is determined to be in. Then, the position, size, and orientation of other XR objects in the layout can be referenced with respect to this location anchor. In particular embodiments, the placement of a location anchor may be made with reference to the user's position and/or view. In particular embodiments, the placement of a location anchor may be made with reference to a specific object in the user's environment, e.g., the anchor may be tied to the location of a desk, TV, oven, etc. identified in the user's environment. In particular embodiments, the placement of a location anchor may be tied to a specific point in space (e.g., as defined by GPS coordinates for the placement of the location anchor).

Figure 3A:
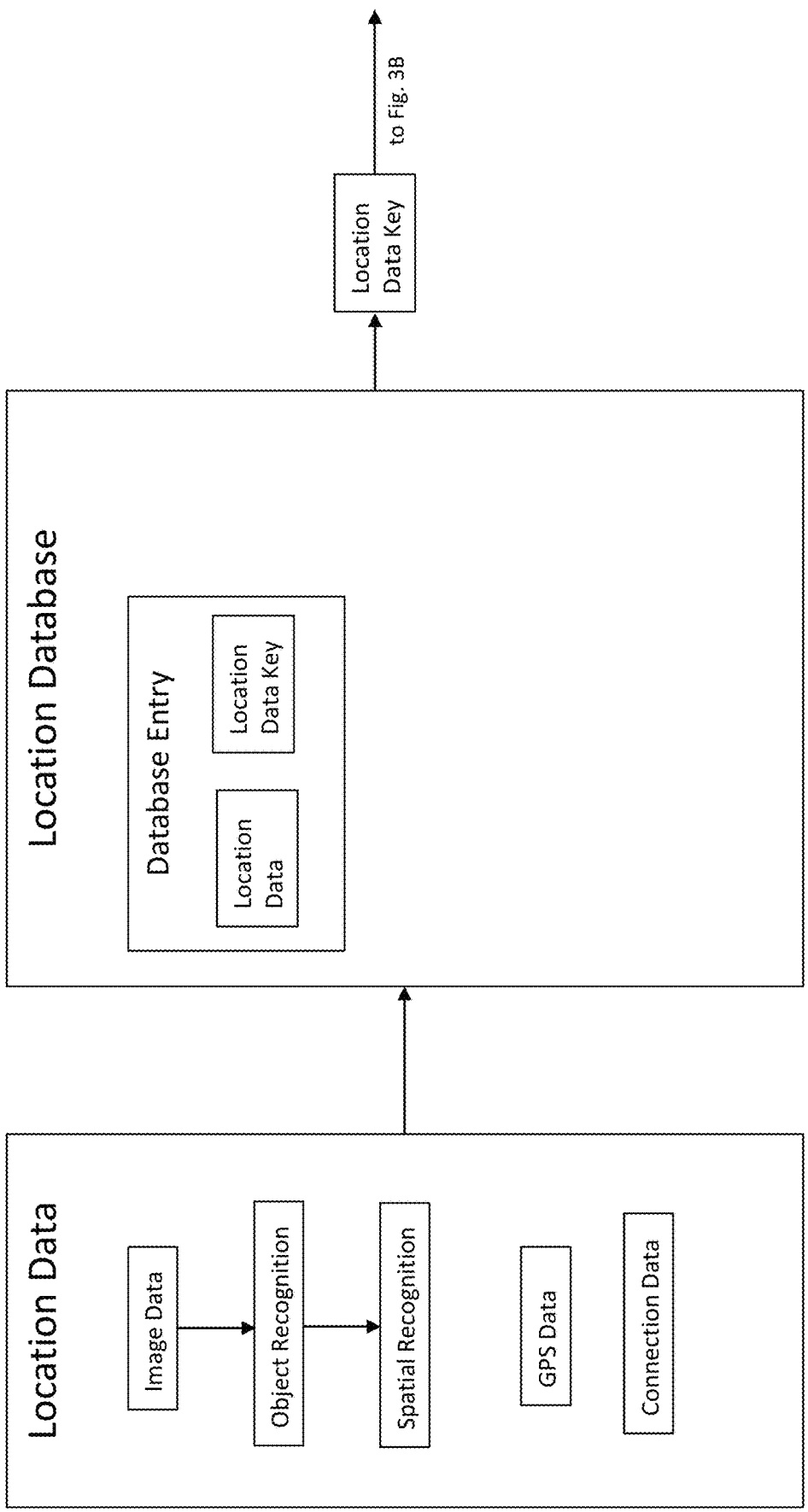
FIGS. 3A-3D illustrate an example procedure for performing the example method of FIG. 1.
Figure 3B:
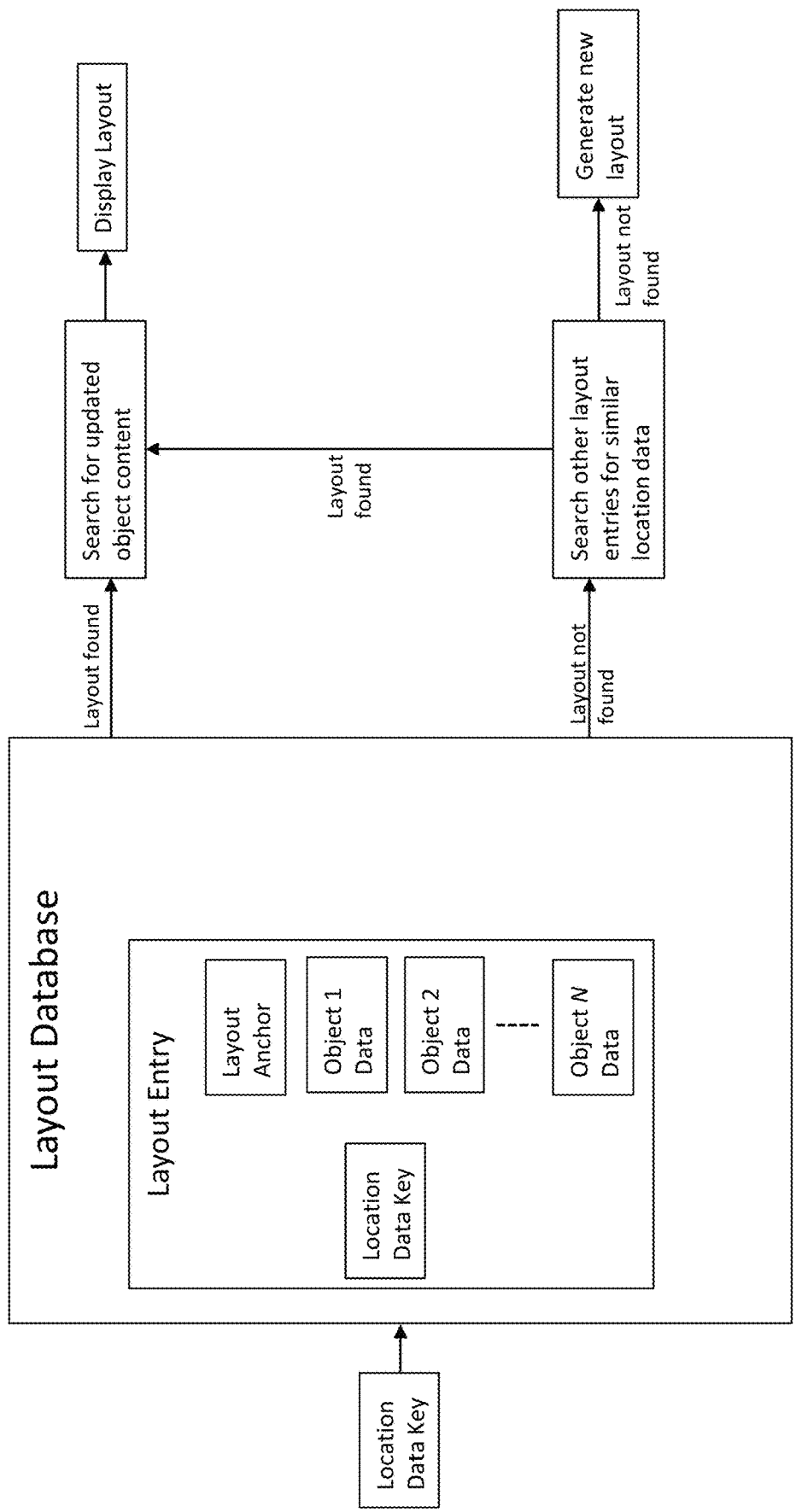

In the example of FIG. 3B, the location data key obtained in FIG. 3A is used to perform a lookup in a layout database, which specifies: location parameters such as a location anchor, an identification of the specific XR objects (e.g., applications) associated with a particular location, and the position of each object relative to the location anchor. In particular embodiments, such as in the example of FIG. 3B, if a layout in the layout database is found based on the location data key, then the layout parameters may be obtained from the found entry in the layout database. On the other hand, if no layout is found, then particular embodiments may use location data to determine a similarity between the user's determined location and other locations in the layout database. For example, if an oven is identified in the user's environment, then the user may be determined to be in a kitchen, although the particular kitchen the user is in may not be known. In this example, the layout database may be searched for other layouts corresponding to a "kitchen," e.g., a layout corresponding to the user's home kitchen, and those similar entries may be used to determine a layout for the user's current location. For example, the layout parameters for a similar entry may be used to generate the layout for the user's current location. In particular embodiments, if there are multiple similar locations in the layout database, then a user may be presented with an identification of similar layouts and can select a particular similar layout to use as the layout for their current location. In particular embodiments, if no matching layout and no layout corresponding to a suitably similar place is found, then a new layout may be generated for the user. This may include a default layout or may include launching a layout-creating application in which the user can select and place XR objects for inclusion in the layout.

Figure 3C:
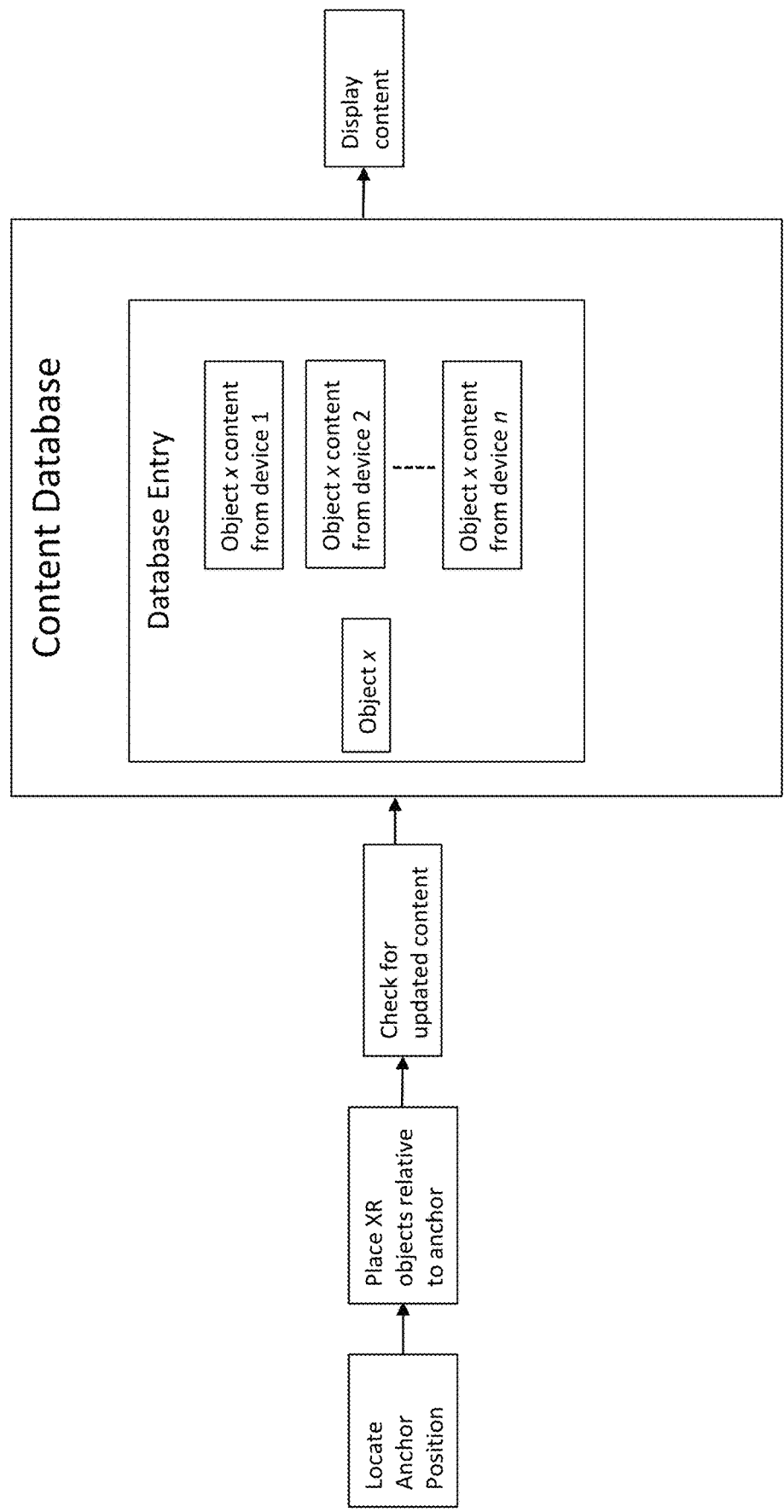

In particular embodiments, if a matching layout or a similar layout is found, then an XR system may search for updated content for the XR objects in the layout before displaying the layout to the user. For example, as illustrated in FIG. 3C, once the specific XR objects for a layout are identified, then a content database may be searched for updated content for each object. For example, the identity of the object (e.g., object x) may be used to perform a lookup in a content database for that object. The database may include content from multiple different devices of the user, such as the user's phone, computer, TV, etc., or the database may ping these devices for their most recent content corresponding to the XR object, or may include a pointer to that content, e, g., as stored on the host device. In particular embodiments, the most recent content for an object may be used as the content to display for the user. In particular embodiments, the most recent content as defined by a particular place may be used. For example, if a layout for a user's office includes a web browser, then the most recent content for the web browser corresponding to any "office" location may be used as content for the current layout. In other words, more recent content for a web browser application may not be selected for display if it is not relevant to the user's "office" location.

Figure 3D:
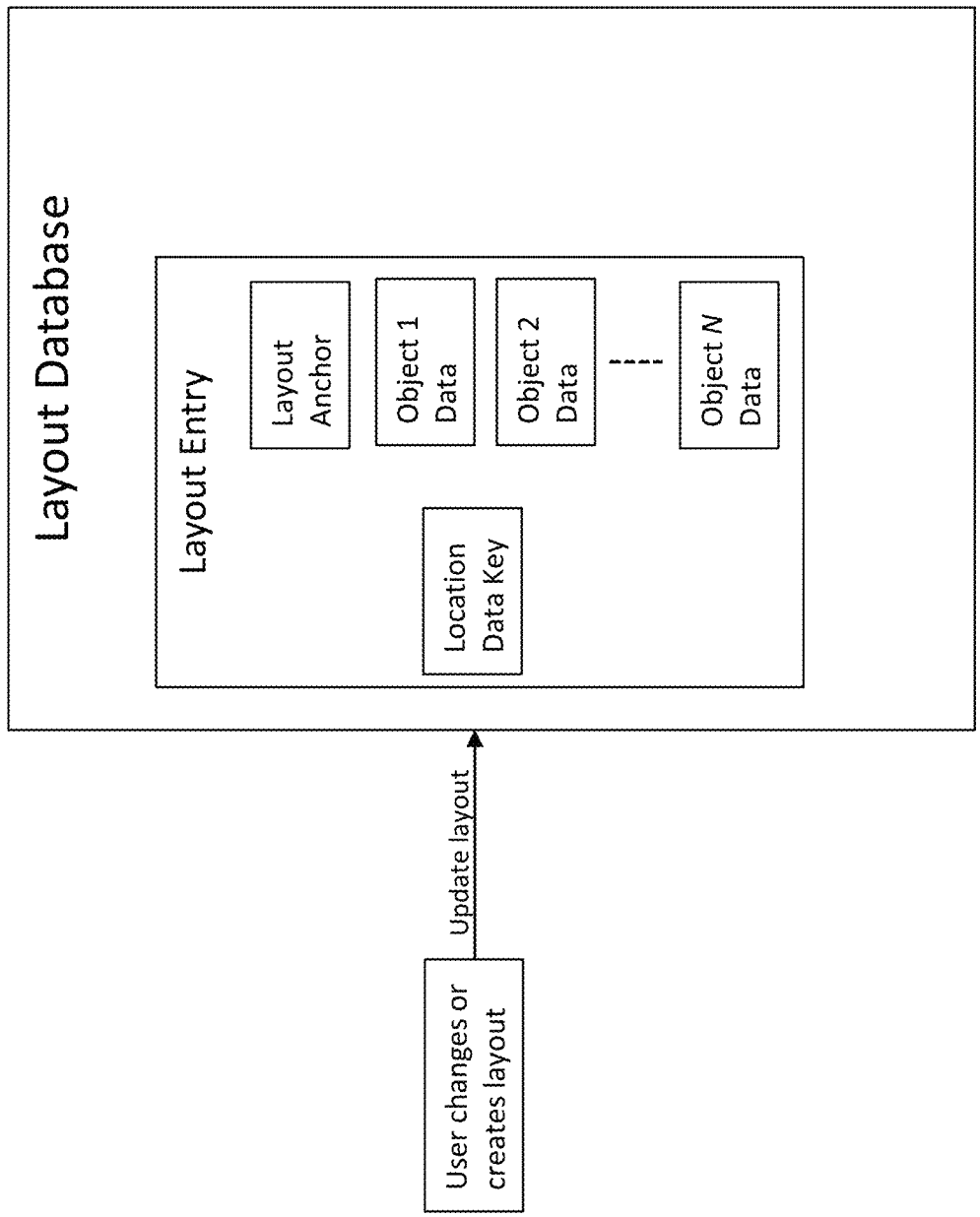

Step 130 of the example method of FIG. 1 includes displaying, by a display of the XR system, the location-specific layout in the XR environment. This display may be updated as the user changes the layout, for example by opening or closing XR objects or by updating content in an XR object. In particular embodiments, as illustrated in FIG. 3D, when a user changes or creates a new layout for a particular location, then an entry in the layout database corresponding to the user's location data may also be updated. In this way, and as explained in the examples above, when a user begins an XR session in a particular location, the XR session automatically begins with content that is relevant to the user, e.g., by providing the layout that the user last used in that particular location, as modified, in particular embodiments, by relevant content updates that have occurred since the user last used an XR system in that specific location. The user need not re-select content each time the user begins a new session, nor is the user merely presented with content from the user's most recent XR session, which may not be relevant to a user in their current location. In addition, a user can pick up XR sessions where they left off even if the session does not correspond to the user's exact location but rather to a particular relevant place. For example, a user working on an XR system at work can leave work and then begin an XR session in their home office that provides the user with the layout last used at work, and/or with XR content that has been updated based on their work session.

In particular embodiments, layouts may be shared between users and/or between locations for a particular user. For example, two or more users could share a "kitchen layout" for their home kitchen, and updates made by one user to the layout may be surfaced to the other user. In particular embodiments, layouts may be shared between devices. For example, a user may access a user profile on any XR device, and then that user's layouts may be loaded by that XR device.

Particular embodiments may repeat one or more steps of the method of FIG. 1, where appropriate. Although this disclosure describes and illustrates particular steps of the method of FIG. 1 as occurring in a particular order, this disclosure contemplates any suitable steps of the method of FIG. 1 occurring in any suitable order. Moreover, although this disclosure describes and illustrates particular components, devices, or systems carrying out particular steps of the method of FIG. 1, such as the computer system of FIG. 10, this disclosure contemplates any suitable combination of any suitable components, devices, or systems carrying out any suitable steps of the method of FIG. 1. Moreover, this disclosure contemplates that some or all of the computing operations described herein, including the steps of the example method illustrated in FIG. 1, may be performed by circuitry of a computing device, for example the computing device of FIG. 10, by a processor coupled to non-transitory computer readable storage media, or any suitable combination thereof.

Figure 4:
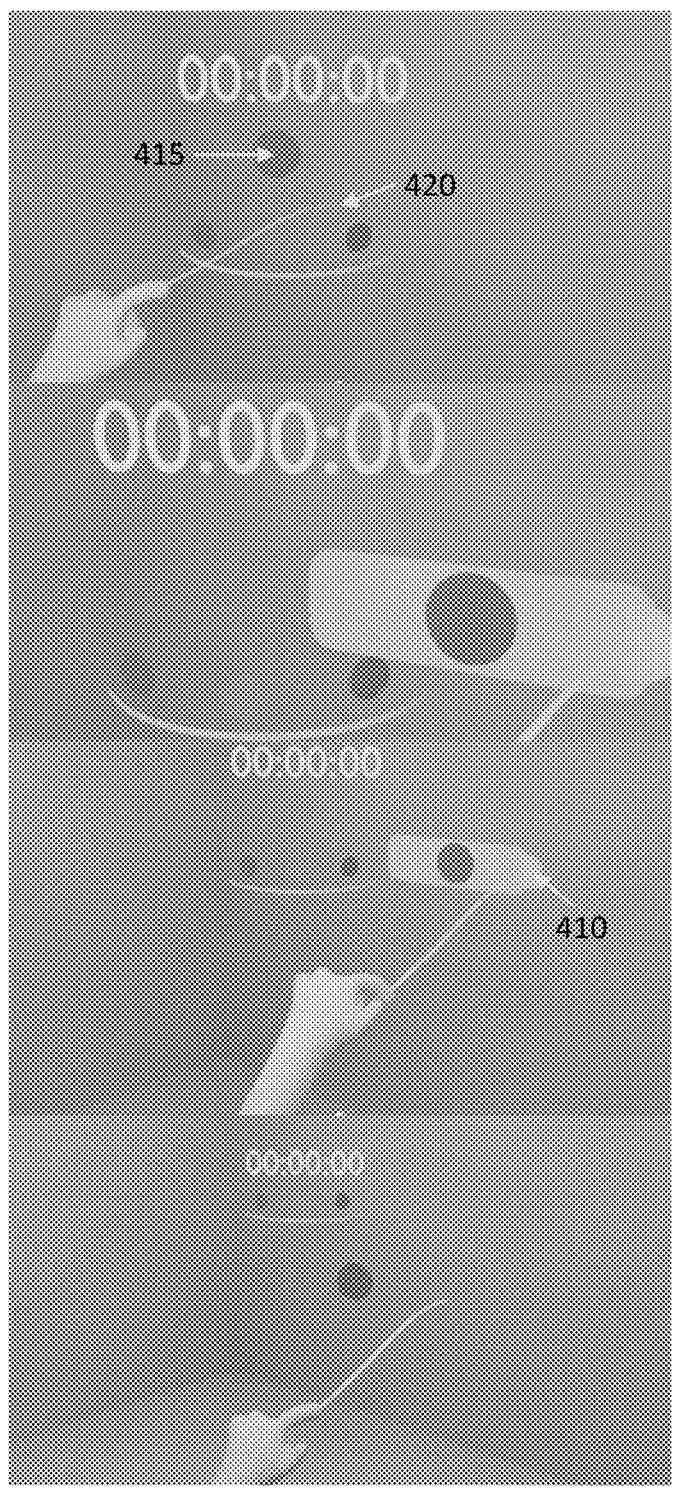
FIG. 4 illustrates an example interactive element displayed in association with a selected XR object.

In particular embodiments, an XR system may allow customizable placement of some or all XR objects displayed in an XR scene. For instance, in particular embodiments, a user may provide input identifying a particular XR object, for example by selecting the object, hovering over the object, performing a gesture on the object, etc. After identifying the object, the system may display an interactive element in association with the selected object. The interactive element can be used to move the particular XR object relative to the XR environment, for example by changing the position of the element, rotating the element, scaling the element, or a combination thereof. FIG. 4 illustrates an example embodiment in which the graphical element is a tab bar 410 generated for element 415 when a user moves a cursor 420 near element 415. As illustrated in FIG. 4, the tab bar disappears when a user finishes moving element 415. In particular embodiments, the selected object may be visually identified, for example by placing a box around the object when the object is selected, as illustrated in FIG. 4. In particular embodiments, a user can group nearby element using a "gather" command, such as a gather button. In particular embodiments, one or more XR objects may move near other nearby XR objects when a user initiates a gather command.

Figure 5:
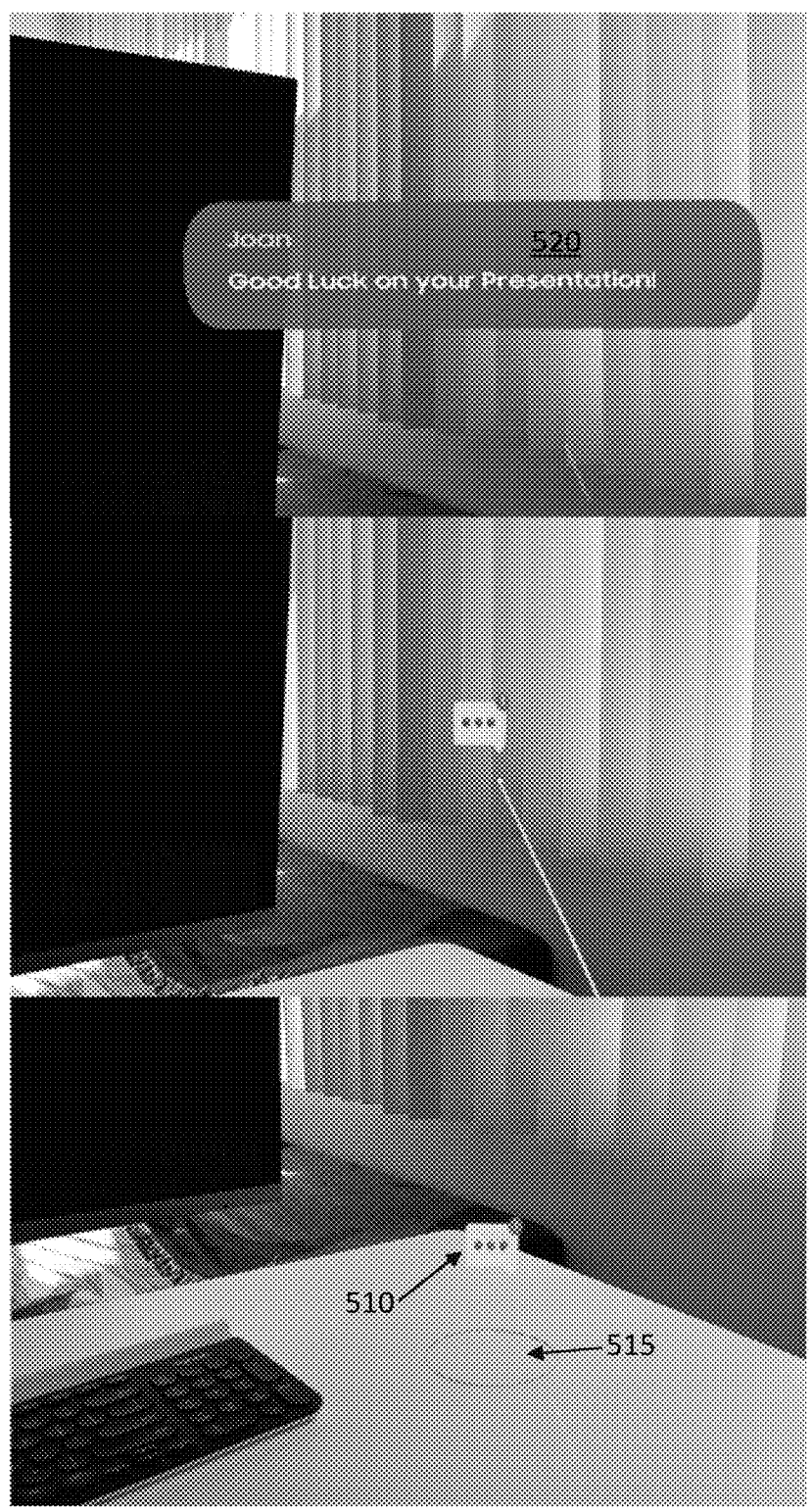
FIG. 5 illustrates an example display of a notification in XR space.

In particular embodiments, an XR environment may include a notification center, which is a space defined for providing information about notifications, such as notifications from applications or from the XR system. A user may define the area in which the notification center will occur. In particular embodiments, when there are no unread notifications, then the notification center may not be visible in the XR environment. In particular embodiments, when a new notification occurs, an icon indicating the notification may appear in the notification center. For example, FIG. 5 illustrates an example in which notification icon 510 appears in notification center 515, identified by the ring illustrated in FIG. 5. In particular embodiments, a user may interact with a notification icon, for example by performing a gesture such as pulling the notification up, to show the full notification. For example, FIG. 5 illustrates that notification icon 510 has been pulled up sufficiently so that notification 515 is displayed. In particular embodiments, a user may pull a notification or notification icon down to dismiss. In particular embodiments, when there are multiple unread notifications, then the notifications may appear in a circular order around the notification center. In particular embodiments, a notification icon may be restricted to a notification center until the user sufficiently pulls it up (to expand) or down (to dismiss), communicating to the user whether the notification has been sufficiently moved to trigger the associated functionality.

In particular embodiments, an XR system may help prevent inadvertent interactions between a user and an object. For example, the system may receive input from a user that moves a particular XR object from its initial position to a subsequent position. If the distance between the initial position and the subsequent position is less than a threshold distance, then the XR object may return to its initial position. However, if the subsequent position is greater than the threshold, then the object's position may be changed by the user, and the user can place the object anywhere in the XR environment, including at distances from the initial position that are less than threshold. In other words, once the user has moved an object beyond the threshold, then the object is unlocked from its initial position, and its position will be updated to be the position at which the user releases the object, which may be the same as the initial position or may be a different position. Thus, the threshold ensures that a user has intentionally, rather than accidentally, moved an object, and treats small object movements as unintentional. In particular embodiments, a user or the XR system may define a container that treats one or more objects as a group, and a "gather" command may return moved objects in a container back to their original position within their container.

In particular embodiments, a visual indicator may be provided when a user moves or interacts with an XR object. For example, the visual indicator may be a translucent container that encapsulates a moved object, so the user may understand what set of objects they are interacting with. As another example, the visual container may be a wireframe, translucent rectangle, translucent sphere or opaque border, or any other suitable indicator that visually communicates to the user what is being interacted with, e.g., moved.

Figure 6:
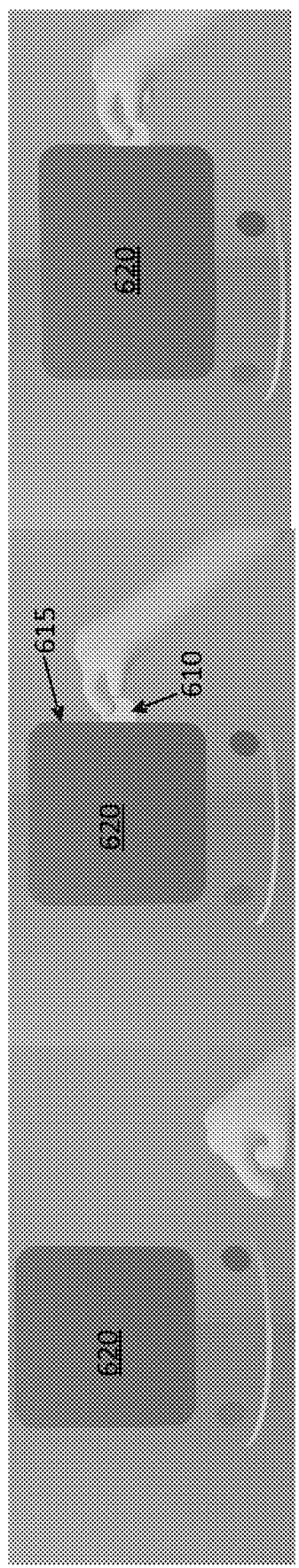
FIG. 6 illustrates an example graphical element for adjusting the size of an XR object.

In particular embodiments, an XR system may provide interactions for modifying the size of an XR object. For example, a user may provide input identifying a particular XR object, for example by selecting the object, hovering over the object, performing a gesture on the object, etc. A graphical interface may then be provided along one or more edges of the object, and the user can select the interface and move the interface in a direction perpendicular to the edge in order to change the size of the XR object in that direction. For example, FIG. 6 illustrates a tab 610 on an edge 615 of object 620 that a user can move to expand or shrink object 620 in the direction perpendicular to edge 615 by moving tab 610 in that perpendicular direction. While the example of FIG. 6 illustrates a single tab 610, this disclosure contemplates that multiple graphical interfaces for resizing an object may be provided. In particular embodiments, a user can select and move a graphical interface along the edge of an object in order to resize the object in a different direction.

In particular embodiments, a user can scroll content in an object, such as content in an application, when the content is larger than the object's presentation in the XR environment. For example, a user can pull or swipe on content in a panel in a direction in order to scroll content in that direction (or, in particular embodiments, in the opposite direction). In particular embodiments, if an object such as an application has multiple modes, then a user may pull the content to switch between modes. For example, when a clock application is displaying the time in a time mode, a user can pull on the content displayed in the clock application to move to a stopwatch mode, which correspondingly updates the content displayed in the clock application (i.e., by showing stopwatch content).

Figure 7:
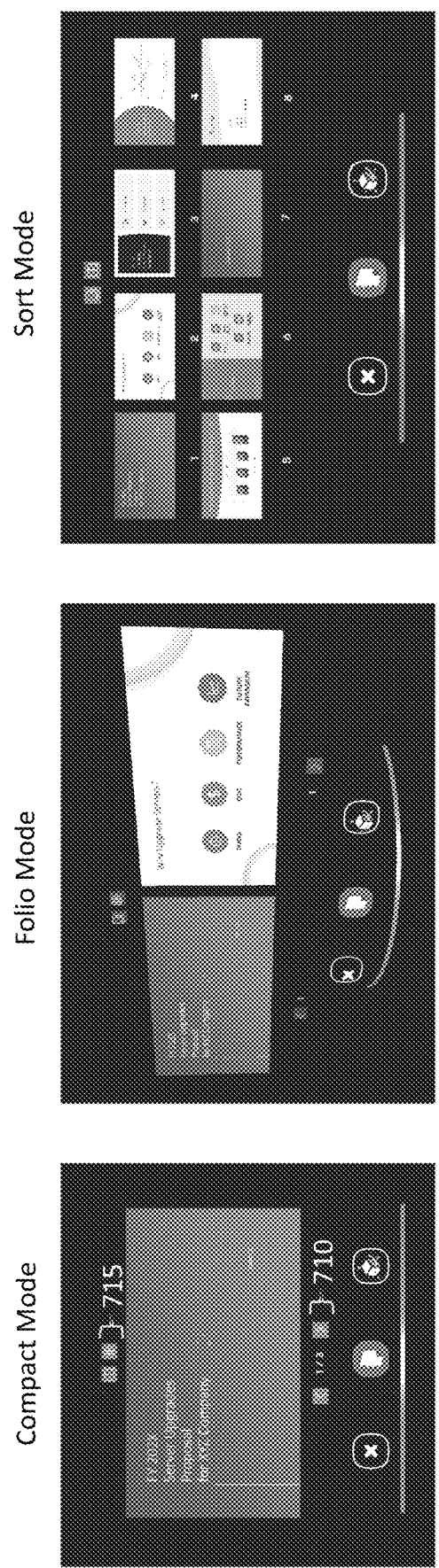
FIG. 7 illustrates examples of different modes for viewing textual content in XR space.

In particular embodiments, text-based content, such as PDF content, can be displayed in different modes in an XR environment. A user can select among these display modes. For example, a compact mode may display one page of content at a time. A folio mode may display two pages next two each other, while a sort mode may display multiple modes simultaneously. FIG. 7 illustrates examples of these different modes. As illustrated in FIG. 7, a user can navigate among modes by interacting with a mode interface, such as arrows 710 or icons 715. In particular embodiments, a user can navigate among content displayed in a text-based application by pulling or swiping on pages in the application.

In particular embodiments, when a user is moving a first XR object, such as by changing the first object's position, size, and/or orientation in the XR environment, then a second XR object may be deemphasized in the XR space when the first objects comes sufficiently near the second object (e.g., when the two objects would collide, from the user's perspective, in XR space, or when the two objects are within a threshold distance of each other). For example, the second object may increase in translucency while the first object is being moved. In particular embodiments, the amount of translucency may depend based on how near the first object is to the second object. By deemphasizing the second object, the XR system can help the user identify which object they are interacting with, and can let the user view the object they are interacting with even when that object collides with another object in XR space. When the user is finished moving the first object, then the deemphasis of the second object may be removed.

Figure 8:
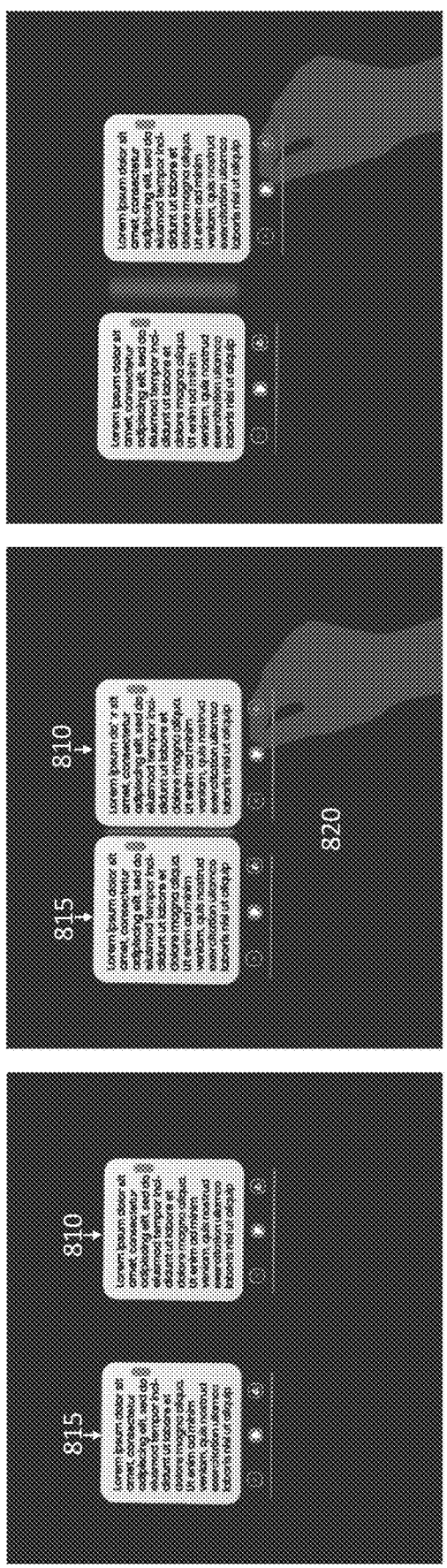
FIG. 8 illustrates an example of connecting two objects in XR space.

In particular embodiments, when a user moves a first XR object sufficiently near a second XR object (e.g., less than a threshold distance away) and releases the first object, then the first and second object may be grouped together and treated as a single object for user interactions (e.g., moving, minimizing, etc.). In particular embodiments, a graphical element may be displayed identifying that the two objects are grouped together. For example, FIG. 8 illustrates an example in which object 810 is brought sufficiently near object 815 and the two objects are grouped, as indicated by element 820. In particular embodiments, an interaction such as selecting an object and holding it for a predetermined period of time (e.g., two seconds) may cause the two objects to de-group.

Figure 9:
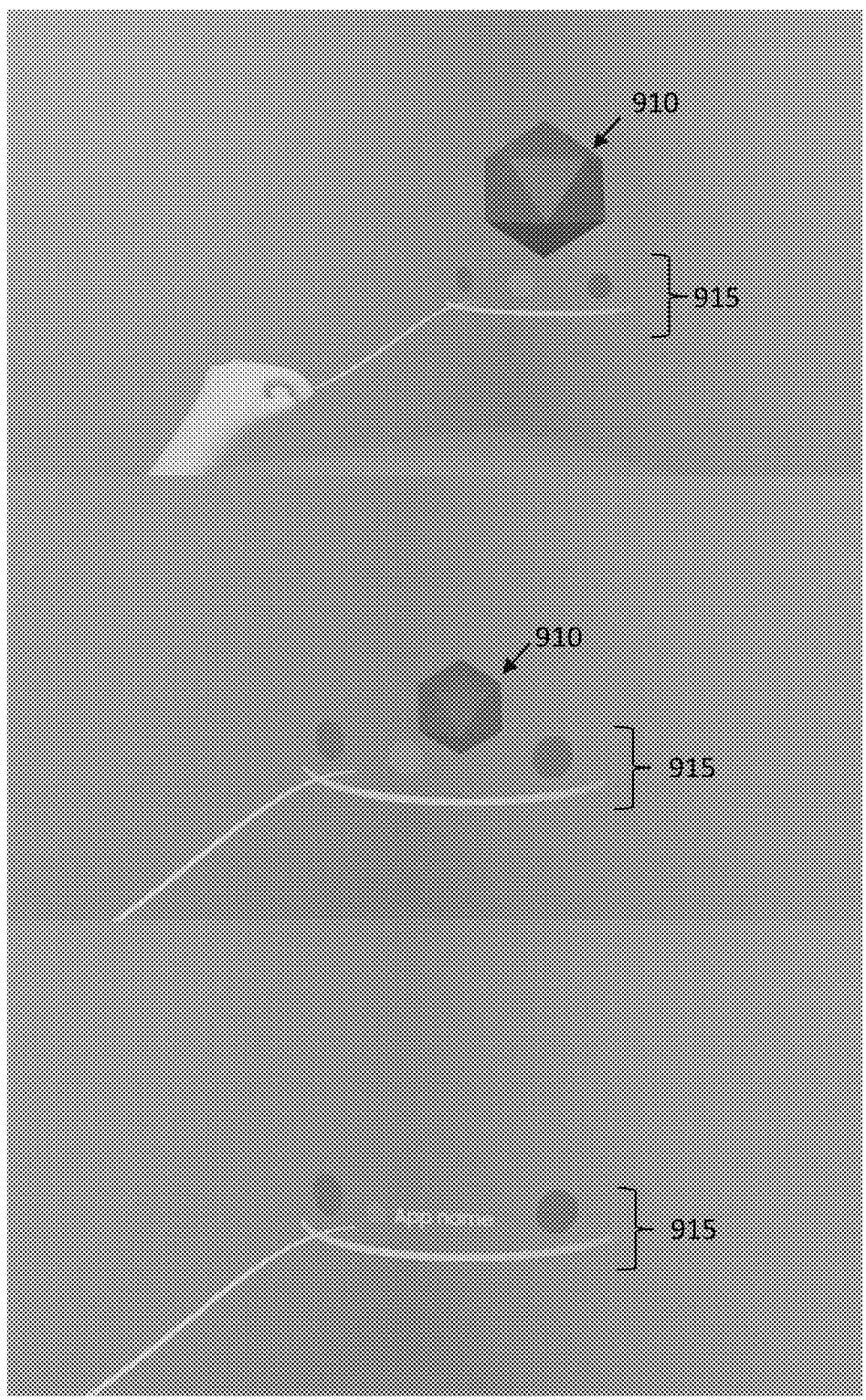
FIG. 9 illustrates an example of minimizing an XR object in XR space.

In particular embodiments, a user can minimize an XR object, such as an application. For example, as illustrated in FIG. 9, a user can minimize application 910 by interacting with control bar 915, such as by double-tapping control bar 915. In particular embodiment, each object in an XR environment, and in particular embodiments each group of objects, may have an associated control bar for interacting with that object or group of objects. In particular embodiments, an object's control bar may be displayed even when the object is minimized, as illustrated in FIG. 9. A user can interact with the control bar of a minimized object to return the object to its original display state, for example by double-tapping on the control bar of a minimized object. In particular embodiments, a user can move an object, even while minimized, by moving the associated control bar. In particular embodiments, a control deck's display may be different when a corresponding object is minimized than when that object is not minimized. For instance, in the example of FIG. 9, control bar 915 displays the name of application 910 when the application is minimized.

Figure 10:
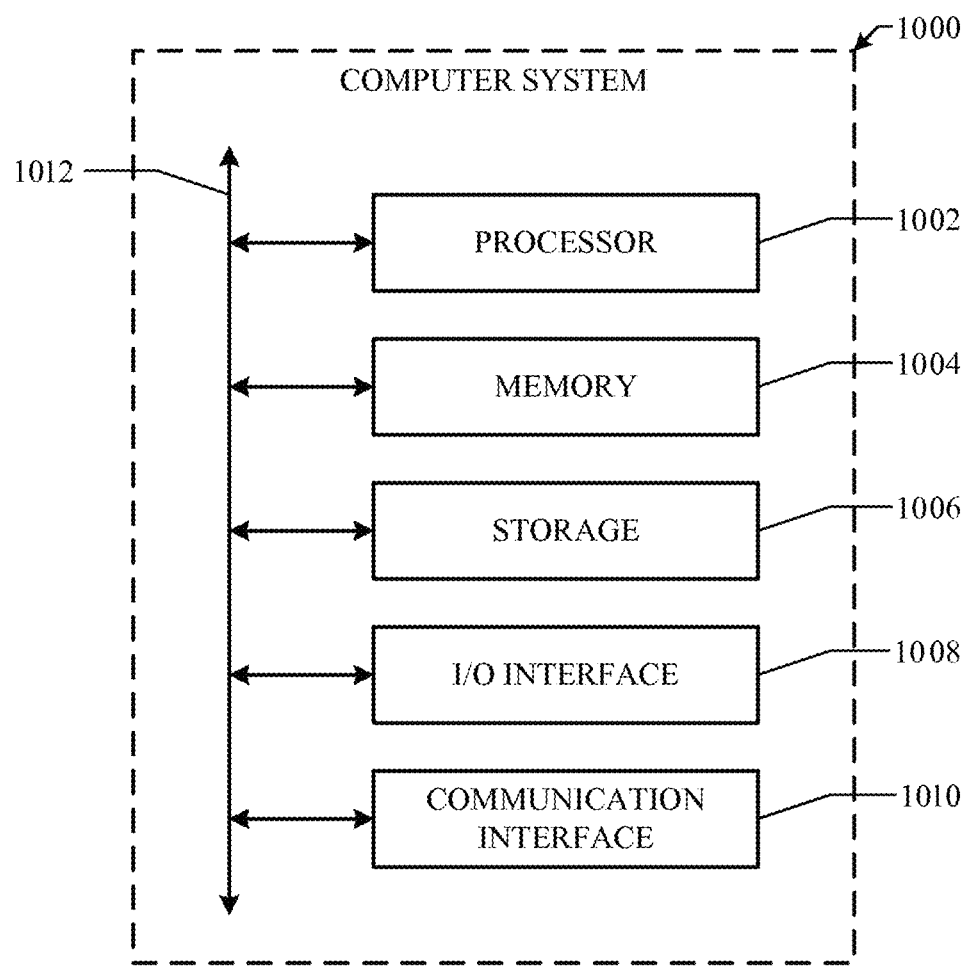
FIG. 10 illustrates an example computing system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate.

Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

What is claimed is:

1. A method comprising:
   determining a location of a user of an extended reality (XR) system;
   determining, based on the determined location, a location-specific layout for one or more XR objects in an XR environment for display to the user, wherein the location-specific layout specifies a position, size, and orientation of each of the one or more XR objects based on the determined location; and
   displaying, by a display of the XR system, the location-specific layout in the XR environment.

2. The method of claim 1, wherein determining the location of the user comprises identifying a physical environment in the vicinity of the user.

3. The method of claim 2, wherein identifying a physical environment in the vicinity of the user comprises identifying one or more objects in the physical environment.

4. The method of claim 3, wherein identifying a physical environment in the vicinity of the user further comprises identifying a spatial relationship between two or more objects in the physical environment.

5. The method of claim 1, wherein determining the location of the user comprises identifying one or more of: GPS coordinates of a device associated with the user, or a connection between a device associated with the user and another device.

6. The method of claim 1, wherein determining a location-specific layout for one or more XR objects in an XR environment for display to the user comprises:
   determining a placement of a location-specific anchor associated with the determined location; and
   determining, for each XR object, a location in the XR environment relative to the location-specific anchor.

7. The method of claim 6, wherein the placement of the location-specific anchor is based on a location of one or more objects in a physical environment associated with the determined location.

8. The method of claim 1, wherein determining, based on the determined location, a location-specific layout for one or more XR objects in an XR environment for display to the user comprises:
   determining whether an entry in a layout database corresponds to the user's determined location;
   when an entry in a layout database corresponds to the user's determined location, then using one or more layout parameters associated with the entry to determine the layout; and
   when an entry in a layout database does not correspond to the user's determined location, then:
   determining a similarity between a place corresponding to the user's determined location and a place corresponding to one or more other locations in the layout database;
   selecting, based on the similarity, an entry associated with one of the one or more other locations, and using the selected entry to determine the layout.

9. The method of claim 1, further comprising selecting a content of at least one of the one or more XR objects based on content most recently displayed for the XR object:
   by the XR system at the determined location;
   by an electronic device, other than the XR system, associated the user; or
   in another location-specific layout associated with another location of the user that is different than the user's determined location, wherein a place corresponding to the other location is similar to a place corresponding to the determined location.

10. The method of claim 1, further comprising displaying, in response to a user input identifying a particular XR object, an interactive graphical element in association with the particular XR object, wherein the interactive graphical element is associated with moving the particular XR object relative to the XR environment.

11. The method of claim 1, further comprising:
    receiving input from the user moving a particular XR object from an initial position to a subsequent position;
    determining whether a distance between the initial position and the subsequent position is greater than a threshold; and
    when the distance is greater than the threshold, then updating a position value associated with the particular XR object; or
    when the distance is not greater than the threshold, then returning the particular XR object to the initial position.

12. The method of claim 1, further comprising:
    receiving input from the user moving a particular XR object from an initial position to a subsequent position;
    determining that a distance between the particular XR object and a second XR object is less than a threshold;

grouping the particular XR object and the second XR object together such that the particular XR object and the second XR object are treated as a single object for one or more user interactions; and displaying a graphical element identifying that the particular XR object and the second XR object are grouped together.

13. The method of claim 1, further comprising:
receiving input from the user moving a particular XR object from an initial position to a subsequent position;
determining that a distance between the particular XR object and a second XR object is less than a threshold; and
increasing a translucency of the second XR object in response to the determination.

14. The method of claim 1, further comprising displaying, in response to a user input identifying a particular XR object, an interactive graphical element along an edge of the particular XR object, wherein the interactive graphical element adjusts a size of the particular XR object in a dimension perpendicular to the edge.

15. One or more non-transitory computer readable storage media storing instructions and coupled to one or more processors that are operable to execute the instructions to:
determine a location of a user of an extended reality (XR) system;
determine, based on the determined location, a location-specific layout for one or more XR objects in an XR environment for display to the user, wherein the location-specific layout specifies a position, size, and orientation of each of the one or more XR objects based on the determined location; and
display, by a display of the XR system, the location-specific layout in the XR environment.

16. The media of claim 15, wherein determining the location of the user comprises identifying a physical environment in the vicinity of the user.

17. The media of claim 15, wherein the media storing instructions is further coupled to one or more processors that are operable to execute the instructions to:
determine a placement of a location-specific anchor associated with the determined location; and
determine, for each XR object, a location in the XR environment relative to the location-specific anchor.

18. An XR system comprising:
a display;
one or more non-transitory computer readable storage media storing instructions; and one or more processors coupled to the non-transitory computer readable storage media, the one or more processors operable to execute the instructions to:
determine a location of a user of an extended reality (XR) system;
determine, based on the determined location, a location-specific layout for one or more XR objects in an XR environment for display to the user, wherein the location-specific layout specifies a position, size, and orientation of each of the one or more XR objects based on the determined location; and
display, by the display of the XR system, the location-specific layout in the XR environment.

19. The system of claim 18, wherein determining the location of the user comprises identifying a physical environment in the vicinity of the user.

20. The system of claim 18, further comprising one or more processors operable to execute the instructions to:
determine a placement of a location-specific anchor associated with the determined location; and
determine, for each XR object, a location in the XR environment relative to the location-specific anchor.

* * * * *